United States Patent
Spears, Jr.

(10) Patent No.: US 7,876,234 B1
(45) Date of Patent: Jan. 25, 2011

(54) TRAILER DEPTH GAUGE

(76) Inventor: Daniel C. Spears, Jr., 1510 Majesty Dr., Jefferson, TN (US) 37760

( * ) Notice: Subject to any disclaimer, the term of this patent is extended or adjusted under 35 U.S.C. 154(b) by 253 days.

(21) Appl. No.: 12/313,775

(22) Filed: Nov. 25, 2008

Related U.S. Application Data

(63) Continuation-in-part of application No. 11/703,870, filed on Feb. 9, 2007, now Pat. No. 7,523,952.

(51) Int. Cl.
*G08B 5/00* (2006.01)
(52) U.S. Cl. .......... 340/815.4; 340/686.1; 340/332; 340/331; 280/414.1; 280/414.2; 280/414.3
(58) Field of Classification Search ............ 340/815.4, 340/506, 541, 603, 686.1, 332, 331; 114/344; 280/414.1, 414.2, 414.3
See application file for complete search history.

(56) References Cited

U.S. PATENT DOCUMENTS

| | | | | |
|---|---|---|---|---|
| 5,515,025 A | * | 5/1996 | Barrows | 340/431 |
| 6,616,166 B2 | * | 9/2003 | Marchese | 280/414.1 |
| 7,692,557 B2 | * | 4/2010 | Medina et al. | 340/988 |
| 2003/0137124 A1 | * | 7/2003 | Marchese | 280/414.1 |
| 2004/0211351 A1 | * | 10/2004 | Emerson et al. | 116/28 R |
| 2008/0117030 A1 | * | 5/2008 | Medina et al. | 340/425.5 |

* cited by examiner

*Primary Examiner*—Daryl Pope
(74) *Attorney, Agent, or Firm*—Peter Loffler

(57) ABSTRACT

A gauge gives a driver of a tow vehicle a visual cue that the trailer is at a proper depth within the water to recover a boat onto the trailer. The gauge has a tubular member that has a top with a red light bulb and a green light bulb thereon. A housing is attached to the tubular member and longitudinally adjusted along a length of the tubular member as needed. A switch, controlled by a float, is located within the housing, such that when there is no water in the housing, the float is at rest and causes the switch to connect the red light bulb to electricity. As water enters the housing, the float rises with the rising water level in the housing and causes the switch to disconnect the red light bulb from and connect the green light bulb to the electricity.

8 Claims, 3 Drawing Sheets

TRAILER DEPTH GAUGE

This application is a continuation-in-part of U.S. patent application Ser. No. 11/703,870 filed on Feb. 9, 2007 now U.S. Pat. No. 7,523,952, which is incorporated herein by reference in its entirety.

BACKGROUND OF THE INVENTION

1. Field of the Invention

The present invention relates to a device that is attached to a boat trailer in order to give the driver of a vehicle pulling the trailer a visual cue indicating that the trailer is at an appropriate water depth to recover the boat onto the trailer.

2. Background of the Prior Art

Boating is a great pastime. Sitting on the water and fishing or just doing nothing but floating is a great way to spend a day. As much fun as boating is, there is work, sometimes frustrating work, that goes into boat usage. As most people are not fortunate enough to actually live on the water, they must launch and recover their boats from a boat ramp. Launching is relatively straightforward, once backing a trailer is mastered of course. Just back the boat trailer into the water until the boat begins to float, float the boat clear of the trailer, pull the trailer back out of the water, and park the tow vehicle and trailer and go boating. If a driver is not sure if the trailer has reached a sufficient depth in the water that allows the boat to float clear of the trailer, the driver simply backs up sufficiently far to assure proper depth as there is no penalty for overshooting the ideal depth for the trailer for boat launch. The problem comes during boat recovery. The trailer must be positioned at an appropriate depth to achieve recovery of the boat, which appropriate depth is within a relatively narrow window. If the trailer is not deep enough within the water, the boat cannot pull up onto the trailer. If the trailer is too deep, then the boat may float free of the trailer possibly causing damage to the boat should it hit a nearby pier or other object and otherwise the boat is not recovered.

To address this problem, one person spots the trailer while another person backs up the tow vehicle and trailer. Once the trailer is at the appropriate depth, then the tow vehicle stops and the boat is recovered. The problem with this method is that oftentimes a spotter is unavailable as one person needs to be driving the tow vehicle and another person needs to be driving the boat. A third person may not always be available. Even if a spotter is available, it is oftentimes difficult to pinpoint the appropriate depth of the trailer for proper boat recovery thereonto. A series of frustrating trial and error attempts must be made in order to achieve proper trailer depth. This problem is especially acute when a single person is towing and recovering, wherein such person must tie down the boat, exit the boat and back the trailer into the water, return to the boat and untie the boat and attempt to load the boat onto the trailer. If the trailer is at an improper depth, the boat must be once again tied down, disembarked, and the trailer depth readjusted. This trail and error method can be quite frustrating and time-consuming to the typical boater.

To address this problem, devices have been proposed that automatically determine when a trailer is at the appropriate depth within the water that assures proper boat recovery onto the trailer and give the driver a cue, either audio, visual, or both of such a condition. These devices, which work with varying degrees of competence, tend to be unusually complex in design and construction making them relatively expensive to manufacture and obtain by a typical boat owner. Additionally, some such devices require extensive modifications to the trailer, which modifications many trailer owners are unwilling to make.

Accordingly, a device is needed that can quickly and accurately determine when a boat trailer is at the proper depth within the water to allow the boat to be easily recovered onto the waiting trailer. Such a device must be of relatively simple design and construction so that it is relatively inexpensive to manufacture so as to be affordable to a large segment of boat trailer owners. Such a device must be relatively simple to install so that extensive modifications to the trailer are not required.

SUMMARY OF THE INVENTION

The trailer depth gauge of the present invention addresses the aforementioned needs in the art by providing a device that quickly and accurately determines when a boat trailer is at the proper depth within the water in order to allow a boat to be recovered onto the waiting trailer. The trailer depth gauge is of relatively simple design and construction so that it is relatively inexpensive to manufacture and is thus affordable to a large segment of boat trailer owners. The present invention is relatively simple to install so that extensive modifications to the trailer are not required.

The trailer depth gauge of the present invention is comprised of a hollow tubular member that has a bottom and a top. The top has a housing attached thereto, the housing holding a first light bulb and a second light bulb therein. The first light bulb emits a first light when illuminated and the second light bulb emits a second light when illuminated such that the first light is of a different color relative to the color of the second light. A housing is attached to the tubular member such that the housing has an opening that allows water to enter and exit the housing. A switch is disposed within the housing and is electrically connected to a source of electric power. The switch switches between a first state wherein the switch connects the first light bulb with the source of electric power and does not connect the second light bulb with the source of electric power, and a second state wherein the switch connects the second light bulb with the source of electric power and does not connect the first light bulb with the source of electric power. A post is disposed within the housing such that the switch is disposed within the post. A float slides along a length of the post and controls the switch such that when the float is at a bottom end of the post, the switch is in the first state and when the float is at a top end of the post, the switch is in the second state. A magnet is located within the float such that the magnet pulls the switch between the first state and the second state during slide travel of the float along the post. The float is a ring member such that the post impales the float and such that the magnet encompasses an inner circumference of the float. The housing has a transparent cover that covers the first light bulb and the second light bulb. The tubular member has a first longitudinal axis and the post has a second longitudinal axis that is parallel to the first longitudinal axis. The position of the housing is adjustable along a length of the tubular member which length is parallel with the first longitudinal axis. The float has positive buoyancy in water. The first color is red and the second color is green.

BRIEF DESCRIPTION OF THE DRAWINGS

Similar reference numerals refer to similar parts throughout the several views of the drawings.

DESCRIPTION OF THE PREFERRED EMBODIMENT

Figure 1:
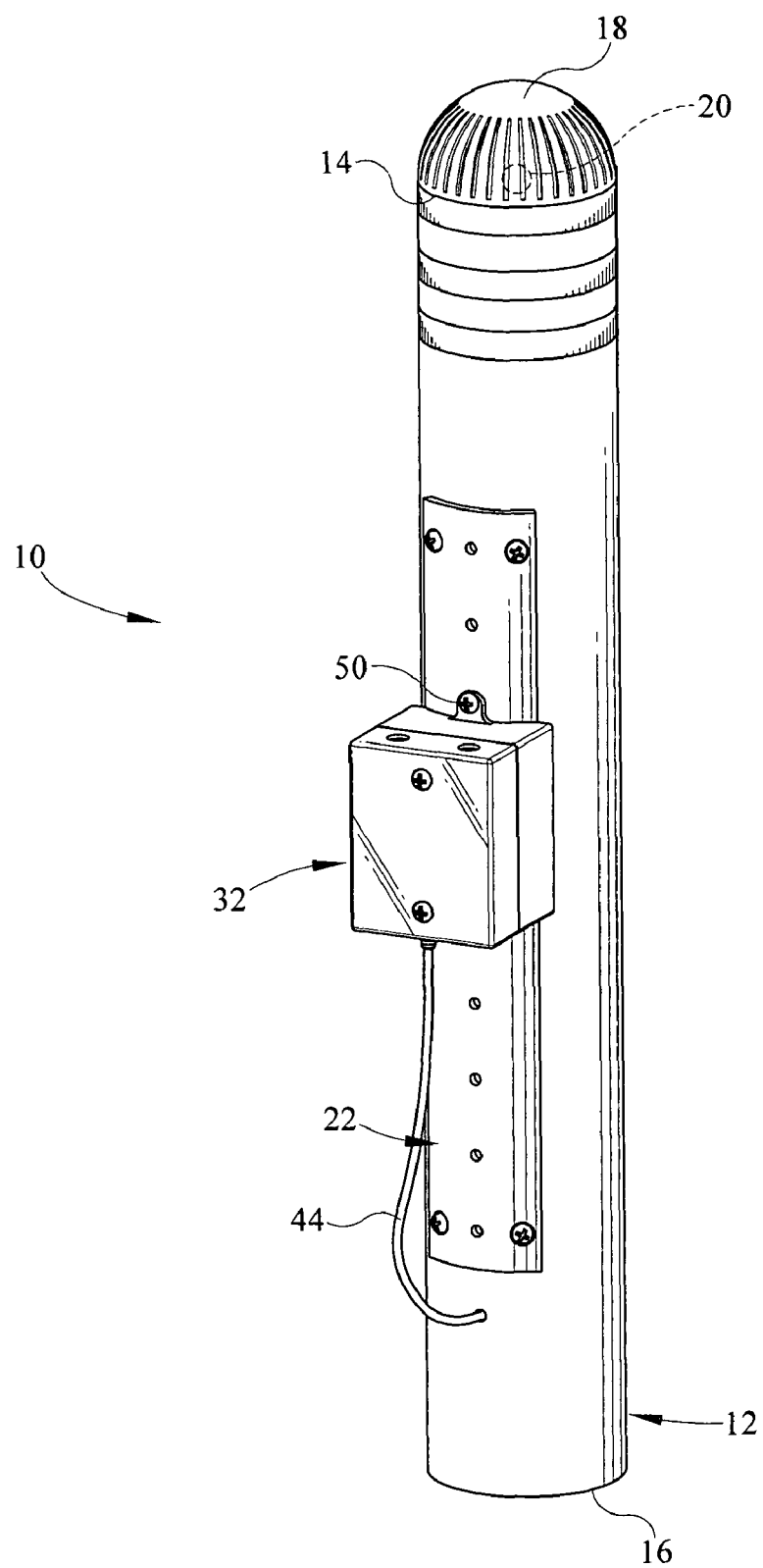
FIG. 1 is a perspective view of the trailer depth gauge of the present invention.
Figure 2:
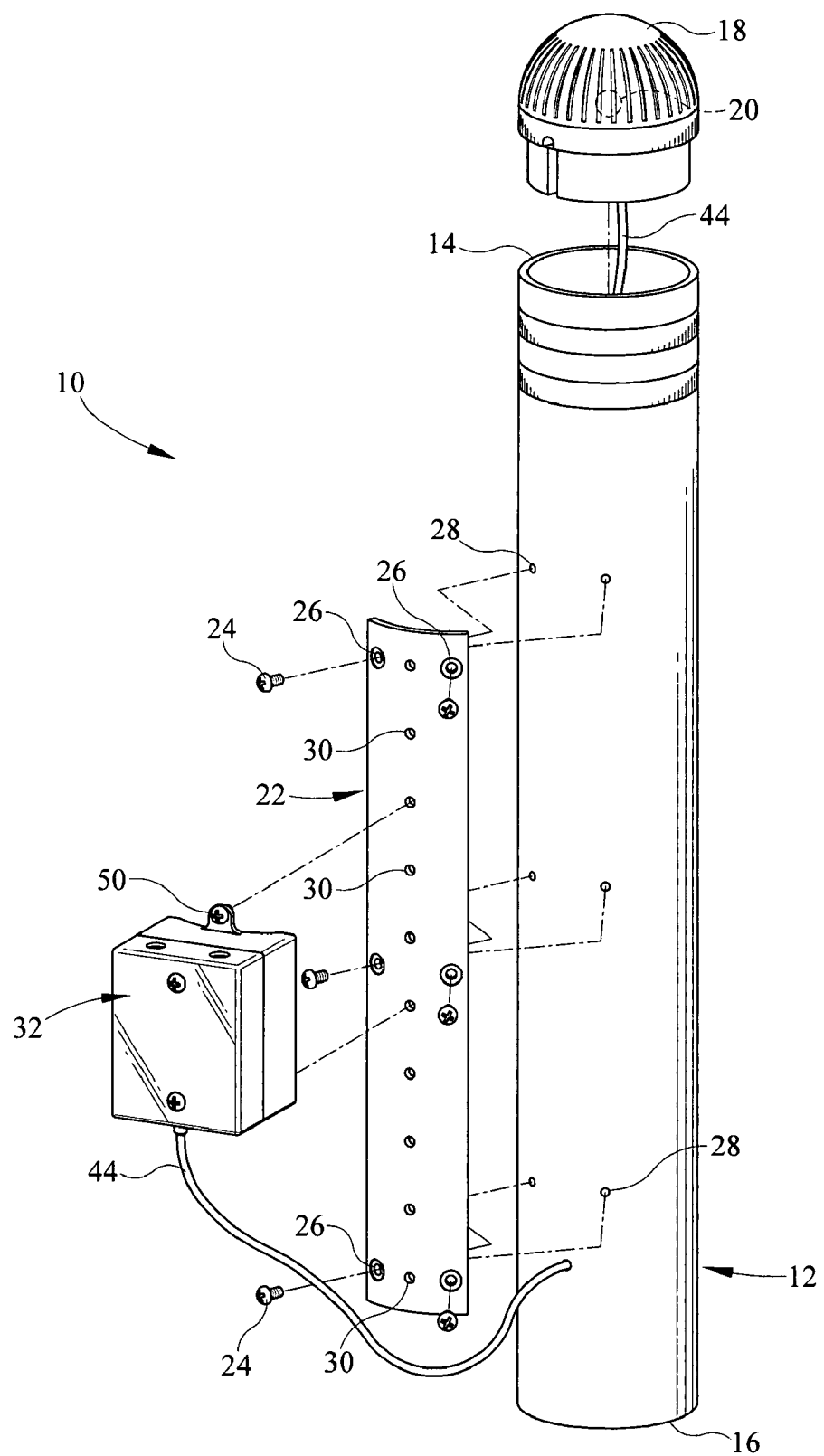
FIG. 2 is a partially exploded perspective of the trailer depth gauge.
Figures 3, 4, 5:
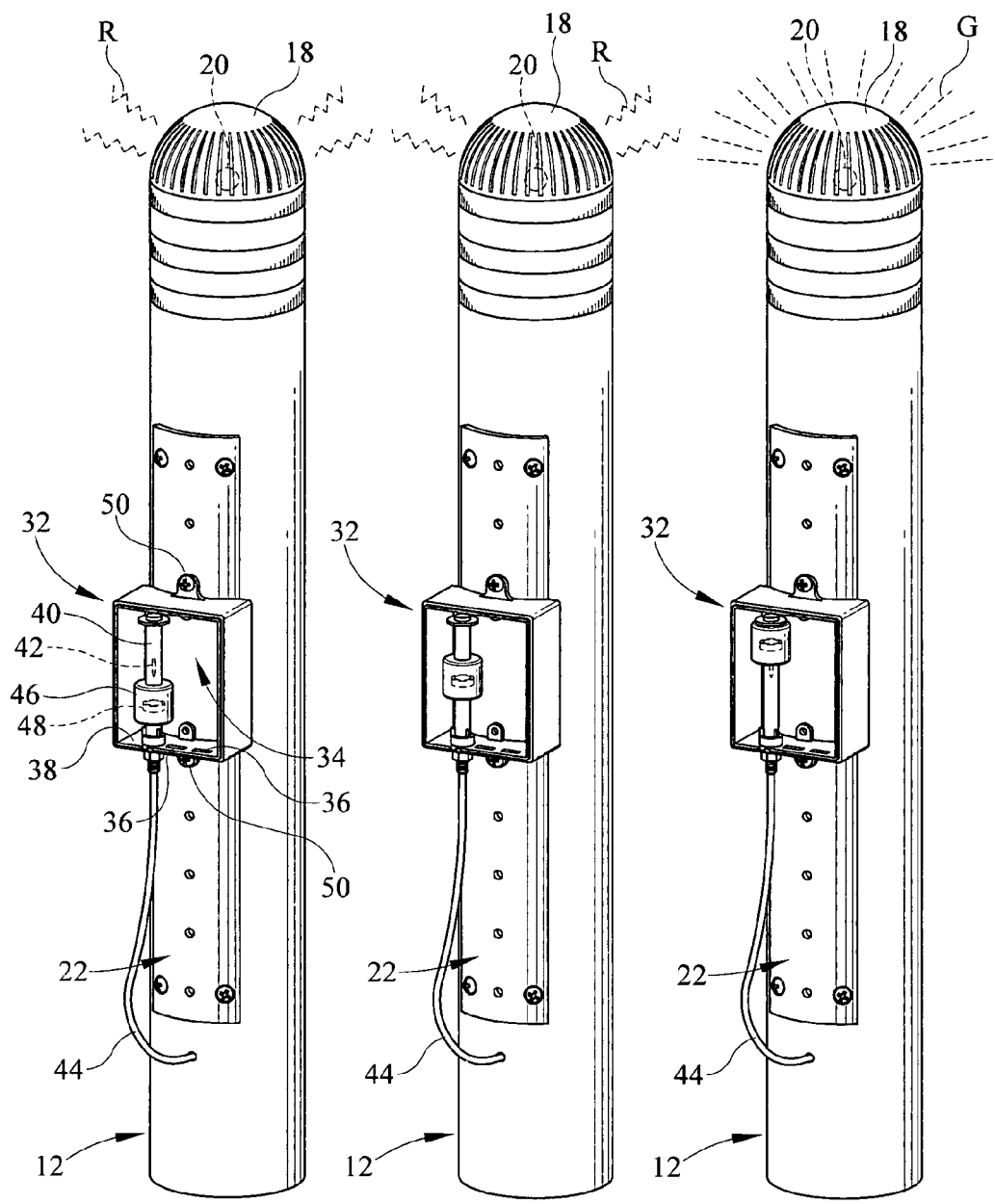
FIGS. 3-5 are perspective views of the trailer depth gauge with the switch housing cover removed, illustrating the rise of the switch controlling float.

Referring now to the drawings, it is seen that the trailer depth gauge of the present invention, generally denoted by reference numeral 10, is comprised of a tubular guide post 12 having a top end 14 and a bottom end 16. The housing 12 may be made from any appropriate material such as PVC. Located on the top end 14 of the guide post 12 is a transparent dome covered light housing 18 affixed thereto, the light housing 18 having a pair of light bulbs 20 therein, one red light bulb and one green light bulb. A mount plate 22 is attached to the guide post 12 by passing screws 24 through mount openings 26 located on the mount plate 22 and corresponding openings 28 located on the guide post 12. As seen, a series of adjustment openings 30 is allocated along the vertical length of the mount plate 22. The mount plate 22 may be made from the same material that is used to make the guide post 12.

A switch housing 32 has a hollow interior 34 and a series of openings 36 located along a bottom end 38 thereof. A vertically aligned slide post 40 (aligned with the longitudinal axis of the guide post 12) is secured within the hollow interior 34 of the switch housing 32. A switch 42 is located within the slide post 40. Three wires 44 are connected to the switch 42, the switch 42 being sealed, such that the switch 42 electrically connects exactly two of the three wires 44 at any time as will be discussed in more detail below. The first of the three wires is connected to a source of electric power (either a battery or to a trailer's electric power (neither shown, however, if a battery is used, the battery is located within the guide post 12 toward the top end 14 thereof and/or the battery is sealed to prevent a short circuit), the second wire is connected to the red light bulb 20 and the third wire is connected to the green light bulb 20, the wires 44 exiting the switch housing 32 and passing into the guide post 12. A fourth wire (not illustrated) is also present but need not be with the three wire 44 bundle, the fourth wire being a ground wire to ground the electrical system in the usual way. A slide 46 slides along the length of the slide post 40, the slide 46 having a magnet 48 encompassing a portion of the inner circumference thereof. In a normally relaxed position, the slide 46 remains at the bottom of the slide post 40. In this position, the magnet 48 pulls the switch 42, which is metallic and magnetically attractive, to second wire that is connected red light bulb 20, thereby closing the connection between the first wire that is connected to the electric power and the second wire connected to the red bulb 20 thereby illuminating the red light bulb 20. As the slide 46 slides up the slide post 40 (which is essentially electrically neutral), the magnet 48 pulls the switch 42 away from the second wire and closes the connection between the first wire and the third wire. This turns off the red light bulb and turns on the green light bulb 20. When the slide 46 slides back down slide post 40, the reverse occurs such that the magnet 48 pulls the switch 42 from the third wire to the second wire turning off the green light bulb 20 and turning on the red light bulb 20.

In order to use the trailer depth gauge 10 of the present invention, the guide post 12 is either attached to one of a trailer's guide posts in some appropriate fashion (straps, screws, etc.), or the guide post 12 replaces one of the trailer's guide posts such that the top 14 of the guide post 12 is oriented upwardly. The first wire and the ground wire are either connected to the trailer's electric supply or to a battery within the device 10. The switch housing 32 is attached to the guide post 12 by passing screws 50 through the switch housing 32 and through desired mount openings 26 on the mount plate 22. The switch housing 32 is vertically positioned so that when the trailer is at the desired depth to load a boat onto the trailer, the slide 46 is just at the top of the slide post 40. During initial installation, the switch housing 32 can be arbitrarily positioned and thereafter adjusted up or down as needed when the trailer is in the water. The wires 44 have sufficient play in order to allow this up or down adjustment.

Initially, the slide 46 is at the bottom of the slide post 40 so that the red light bulb 20 is illuminated and the device 10 emits a red light R. As the trailer enters the water a sufficient amount, water enters the switch housing 32 through the openings 36 on the bottom 38 of the switch housing 32. The slide 46, which has positive buoyancy in water (floats), begins to rise with the rising water level within the hollow interior 34 of the switch housing 32. Once the slide 46 rises a sufficient amount, the switch 42 disconnects the connection between the first wire and the second wire closes the connection between the first wire and the third wire so that the red light bulb 20 turns off and the green light bulb 20 illuminates so that the device 10 now emits a green light G indicating that the trailer is at the proper depth.

While the invention has been particularly shown and described with reference to an embodiment thereof, it will be appreciated by those skilled in the art that various changes in form and detail may be made without departing from the spirit and scope of the invention.

I claim:

1. A gauge to determine the depth of a trailer within a body of water, the gauge comprising:
    a hollow tubular member having a bottom and a top such that the top holds a first light bulb and a second light bulb thereon, the first light bulb emitting a first light when illuminated and the second light bulb emitting a second light when illuminated, the first light being of a different color relative to the color of the second light;
    a housing attached to the tubular member such that the housing has an opening;
    a switch disposed within the housing, the switch electrically connected to a source of electric power, such that the switch switches between a first state wherein the switch connects the first light bulb with the source of electric power and does not connect the second light bulb with the source of electric power, and a second state wherein the switch connects the second light bulb with the source of electric power and does not connect the first light bulb with the source of electric power;
    a post disposed within the housing, such that the switch is disposed within the post; and
    a float that slides along a length of the post and controls the switch such that when the float is at a bottom end of the post, the switch is in the first state and when the float is at a top end of the post, the switch is in the second state.

2. The gauge as in claim 1 further comprising a magnet located within the float such that the magnet pulls the switch between the first state and the second state during slide travel of the float along the post.

3. The gauge as in claim 2 wherein the float is a ring member such that the post impales the float and such that the magnet encompasses an inner circumference of the float.

4. The gauge as in claim 1 further comprising a transparent cover attached to the top of the tubular member such that the first light bulb and the second light bulb are held within the transparent cover.

5. The gauge as in claim 1 wherein the tubular member has a first longitudinal axis and the post has a second longitudinal axis that is parallel to the first longitudinal axis.

6. The gauge as in claim 5 wherein the position of the housing is adjustable along a length of the tubular member which length is parallel with the first longitudinal axis.

7. The gauge as in claim 1 wherein the float has positive buoyancy in water.

8. The gauge as in claim 1 wherein the first color is red and the second color is green.

\* \* \* \* \*